Aug. 3, 1965  N. A. WAAG  3,197,949
ADJUSTABLE GRASS CATCHING ATTACHMENT FOR ROTARY MOWERS
Filed Sept. 16, 1963
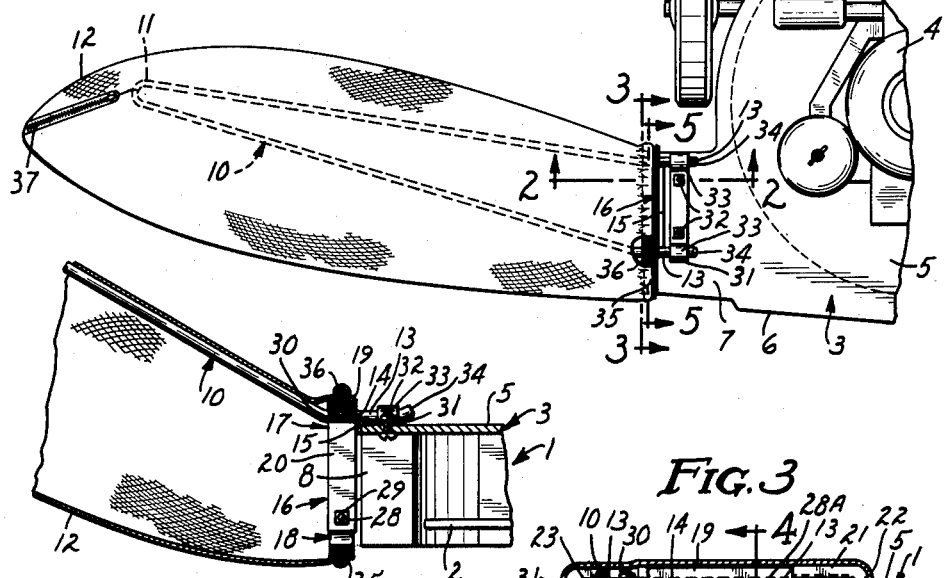
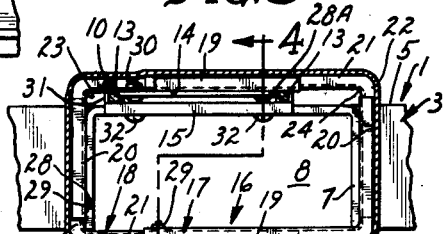
INVENTOR.
NORMAN A. WAAG
BY
Merchant, Merchant + Gould
ATTORNEYS

United States Patent Office 3,197,949
Patented Aug. 3, 1965

3,197,949
ADJUSTABLE GRASS CATCHING ATTACHMENT FOR ROTARY MOWERS
Norman A. Waag, Minneapolis, Minn., assignor to J. Gordon Campbell, Incorporated, Minneapolis, Minn., a corporation of Minnesota
Filed Sept. 16, 1963, Ser. No. 309,053
4 Claims. (Cl. 56—202)

This invention relates generally to grass catching attachments for lawn mowers, and more particularly it relates to improved grass catching attachments for rotary power mowers of the type having a horizontal rotary cutting blade which rotates within the housing of the mower.

The housings of rotary power mowers of the type to which the present invention pertains define lateral discharge openings or passages for discharging the cut grass from the mower housing. In accordance with the specifications for rotary power mowers of various sizes and because of the design alternatives of various manufacturers, rotary power mowers have been manufactured and sold with housing discharge openings of various sizes.

In view of the above, an important object of the present invention is the provision of a grass catching attachment for rotary lawn mowers which is adapted to fit on or abut against the neck of the housing discharge opening of the mower, and which attachment is designed and constructed so as to be adjustable to fit rotary power mowers having housing discharge openings of various sizes.

Another object of the present invention is the provision of a grass catching attachment for rotary mowers of the type described above which may be quickly and easily but securely attached to and removed from the mower.

A further object of the present invention is the provision of a grass catching attachment for rotary mowers which includes a generally rectangular frame structure which is adapted and adjustable to abut or fit against various sizes of mower discharge openings and which is also adapted for the detachable securement of the mouth of a collection bag about the frame structure.

Further objects of the present invention reside in the provision of a grass catching attachment for rotary mowers of the class described above which is relatively inexpenive to manufacture, but which is durable and strong in construction, and which may be quickly and easily attached and detached without the use of special tools.

The above and still further objects of the present invention will become apparent from a consideration of the following detailed specification, appended claims and attached drawings.

Referring to the drawings, wherein like reference characters indicate like parts or elements throughout the several views:

FIG. 1 is a fragmentary view of a conventional rotary power mower with the present novel grass catching attachment secured thereto;

FIG. 2 is an enlarged fragmentary sectional view as seen generally from the line 2—2 of FIG. 1;

FIG. 3 is an enlarged sectional view taken on the line 3—3 of FIG. 1;

FIG. 4 is an enlarged view in vertical section taken on the broken line 4—4 of FIG. 3, and showing an adjusted alternative position of some portions thereof by dotted lines, and omitting the showing of the bag;

FIG. 5 is an enlarged view in vertical section taken on the line 5—5 of FIG. 1, and also omitting the showing of the bag; and FIG. 6 is an enlarged view in perspective of the frame structure of the present invention.

Referring to the drawings particularly to FIGS. 1 and 2 thereof, the reference numeral 1 represents in its entirety a conventional rotary power mower of the type having a horizontally disposed cutting blade 2 which rotates within the mower housing 3. The cutting blade 2 as shown in FIG. 2 of the drawings, and the path of travel thereof is represented by a dotted line in FIG. 1. A conventional internal combustion engine 4 is mounted on the generally horizontal top wall 5 of the mower housing 3 and provides power for driving the rotary cutting blade 2, normally through the medium of a vertical engine shaft, not shown. The mower housing 3 also defines a depending generally annular side wall 6, and the side wall 6, together with the top wall 5 of the housing 3, cooperate to define a generally laterally extending discharge neck 7 having a discharge opening represented by the reference numeral 8.

For the most part, nearly all rotary power mowers on the market are of the above-noted construction and also include suitable wheels 9, and a handle, not shown. However, some rotary power mowers commercially available have the housing discharge neck 7 extending generally rearwardly from the mower housing 3 instead of from the side thereof, and for this reason it will be understood that the term laterally, as used herein, also refers to a rotary power mower so constructed.

The novel grass catching attachment of the present invention for use on rotary power mowers of the type described above comprises an elongated supporting member, represented generally by the reference numeral 10, and which is preferably and is shown constructed from a single length of heavy wire or rod stock bent generally double at intermediate portion thereof to define a relatively narrow outer end portion 11 adapted to support a grass collection bag 12, and more specifically adapted for insertion within the bag 12, as particularly noted in FIGS. 1 and 2 of the drawings. The supporting member 10 is wider at its inner end portion and it is also bifurcated to define generally horizontally spaced angularly disposed inner end portions or anchoring feet 13.

As shown particularly in FIGS. 2, 3 and 5 of the drawigs, the support member 10 is provided with a frame mounting bar 14 which is rigidly secured, as by welding, between the inner end portions 13 thereof with its top surface in general horizontal alignment with the top surfaces of the inner end portions 13. Also, a lip member 15 is rigidly secured, as by welding, between the anchoring feet or inner end portions 13 of the supporting member 10 in inwardly spaced but generally parallel relation with the frame mounting bar 14. The lip member 15 is angle-shaped in cross section, and as shown in FIG. 2, the same is positioned with its horizontal flange in engagement with the bottom surfaces of the inner end portions 13 of the supporting member 10. The vertical flange of the lip member 15 depends from the anchoring feet or inner end portions 13 of the supporting member 10 and is positioned and arranged to engage the outer edge of the top wall of the housing discharge neck 7 for limiting inward movement of the grass catching attachment disclosed herein. Also, the horizontal flange of the lip member 15 provides support for the attachment, as shown particularly in FIG. 2 of the drawings.

The present invention further comprises a generally rectangular frame, represented generally by the reference numeral 16, and which is rigidly secured to the supporting member 10 and depends therefrom in outwardly spaced relation to the inner end portions 13 of the supporting member 10, as will be more particularly described hereinafter. The frame 16 comprises a plurality of generally angle-shaped frame sections, as shown particularly in FIGURE 6 of the drawings, and more specifically the frame 16 comprises a pair of generally diagonally disposed inner frame sections 17 and a pair of generally diagonally disposed outer frame sections 18. The inner frame sections 17 each have a relatively longer horizontal portion 19 and a relatively short vertical portion 20, and each of the outer frame sections 18 has a relatively long horizontal portion 21 and a relatively short vertical portion 22. Also, inner frame sections 17 have intermediate corner portions 23 and the outer frame sections 18 have intermediate corner portions 24.

In accordance with the present invention, the frame sections 17, 18 are disposed in a generally rectangular manner with the vertical and horizontal portions 19–22 thereof engaging corresponding vertical and horizontal portions of adjacent frame sections 17, 18 and with the intermediate corner portions 23, 24 forming the corners of the generally rectangular frame 16. The frame sections 17, 18 are preferably, and as shown, formed from channel iron so as to be generally U-shaped in cross section and together define an annular channel represented by the reference numeral 25. The frame sections 17, 18 therefore define spaced outwardly extending flange portions and an intermediate web portion. The horizontal portions 21 of the outer frame sections 18 define longitudinally extending slots 26 in the intermediate web portions thereof, and the vertical portions 22 of the outer frame sections 18 also define elongated longitudinally extending slots 27 in the web portions of the same. With this arrangement, the frame sections 17, 18 may be easily secured together with suitable bolts 28, the nuts 29 of which may be recessed and welded within corresponding apertures in the web portions of the inner frame sections 17, 18 may be extended or retracted with respect to one another for increasing or decreasing the size of the frame 16 to correspond with various sizes of mower discharge openings. The frame 16 is rigidly secured to the transverse bar 14 of the supporting member 10 by means of the bolt 28A which secures the frame sections 17, 18 at the upper portion of the frame 16 and also by means of an additional bolt 30, as shown particularly in FIGS. 3 and 5.

It may be pointed out that an additional slot 38 is provided for greater adjustment, wherein the neck 7 may be extremely small. In this case it is necessary to remove the bolt 30 and reinsert through the slot 38 of the member 17 and the mating slot 26 of the member 18.

In order to rigidly but detachably anchor the feet or inner portions 13 of the supporting member 10 to the top wall 5 of the mower housing 3, a clamping bar 31 is provided. The feet or inner end portions 13 of the supporting member 10 are anchored in a suitable position adjacent the discharge opening 8 of the discharge neck 7 so as to position the frame 16 in abutting or encompassing relationship with respect to the discharge opening 8. Accordingly, the clamping bar 31 is provided at its intermediate portion with one or more apertures which are alignable with corresponding apertures in the top wall side of the mower housing 3 so that the clamping bar 31 may be secured thereto with suitable clamping bolts 32. The opposite end portions of the clamping bar 31 are formed to provide downwardly opening clamps 33 adapted for the snug reception of the inner end portions 13 of the supporting member 10, as shown particularly in FIGS. 1 and 2. Further, the extreme inner ends of the feet or inner end portions 13 are upturned, as at 34, to securely anchor the same within the clamps 33 and discourage dislodging of the supporting member 10.

In accordance with this invention, the frame 16 and the anchoring inner end portions 13 of the supporting member 10 are positioned and secured with respect to the mower housing 3 so that the bag-supporting outer end portion 11 of the supporting member 10 projects generally laterally outwardly and upwardly. It is also noted that the reduced inner end or neck portion 35 of the collection bag 12 is received over the outer flange of the frame sections 17, 18 and is provided with an annular endless elastic element 36 so as to provide means for detachably securing the mouth portion of the collection bag 12 about the annular channel 25 of the frame 16.

It will be noted that the collection bag 12 is provided with a zipper 37 or other suitable closure elements so as to permit the emptying of grass clippings collected therein.

With the above in mind, it will be understood that the novel grass catching attachment for rotary mowers described herein is particularly advantageous and adaptable because of its provision of the adjustable frame 16 for aligning the mouth or neck opening of the collection bag 12 with mower discharge openings of various sizes.

This invention has been thoroughly tested and found to be completely satisfactory for the accomplishment of the above objects; and while I have shown and described above a preferred embodiment thereof in which the principle of the present invention has been incorporated, I wish it to be specifically understood that the same may be modified without departure from the scope and spirit of the appended claims.

What is claimed is:

1. A grass catching attachment for lawn mower housings of the type having a lateral discharge opening, said attachment comprising:
   (a) an elongated supporting member having a bag-supporting outer end portion and an inner end portion adapted for securement to the top wall of the mower housing in closely spaced relation to said discharge opening,
   (b) a generally rectangular frame rigidly secured to said supporting member and depending therefrom in outwardly spaced relation to the inner end portion of said supporting member, said frame comprising:
      (1) a plurality of L-shaped frame sections which are slidably interconnected and extensible and retractable with respect to one another for increasing or decreasing the size of said rectangular frame in correspondence with various sizes of mower discharge openings, and
      (2) means for releasably securing said frame sections to one another, and
   (c) a clamping device for detachably securing the inner end portion of the supporting member to the top wall of the mower housing with said frame abutting and generally encompassing the discharge opening of said mower housing.

2. A grass catching attachment for lawn mower housings of the type having a lateral discharge opening, said attachment comprising:
   (a) an elongated supporting member having a bag-supporting outer end portion and an inner end portion adapted for securement to the top wall of the mower housing in closly spaced relation to said discharge opening,
   (b) a generally rectangular frame rigidly secured to said supporting member and depending therefrom in outwardly spaced relation to the inner end portion of said supporting member, said frame comprising:
      (1) a plurality of generally L-shaped frame sections each having a vertical portion and a horizontal portion and an intermediate corner portion,
      (2) said frame sections being disposed with the vertical and horizontal portions of the same engaging corresponding vertical and horizontal portions of the adjacent frame sections and said intermediate corner portions of said frame sections forming corners of said frame.
      (3) the engaged vertical and horizontal portions of said frame sections being slidably interconnected and extensible and retractable with respect to one another for increasing or decreasing the size of said frame to correspond with various sizes of mower discharge openings, and
      (4) means for releasably securing said frame sections to one another, and
   (c) a clamping device for detachably securing the inner end portion of the supporting member to the top wall of the mower housing with said frame abutting and generally encompassing the discharge opening of said mower housing.

3. A grass catching attachment for lawn mower housings of the type having a lateral discharge opening, said attachment comprising:
   (a) an elongated supporting member having a bag-supporting outer end portion and a pair of horizontally spaced inner end portions adapted for securement to the top wall of the mower housing in closely spaced relation to said discharge opening,
   (b) a lip member secured between the spaced inner end portions of said supporting member and depending therefrom to engage the mower housing adjacent the dischrage opening thereof when said attachment is secured to the mower housing,
   (c) a cross-sectionally generally U-shaped generally rectangular frame rigidly secured to said supporting member and depending therefrom in outwardly spaced relation to the inner end portions of said supporting member, said frame comprising:
      (1) two pairs of generally L-shaped frame sections each having a vertical portion and a horizontal portion and an intermediate corner portion,
      (2) said frame sections being disposed with the vertical and horizontal portions of one diagonally disposed pair of sections slidably received in the corresponding vertical and horizontal portions of the adjacent pair of frame sections and said intermediate corner portions of said frame sections forming corners of said frame.
      (3) the engaged vertical and horizontal portions of said frame sections being extensible and retractable with respect to one another for increasing or decreasing the size of said frame to correspond with various sizes of mower discharge openings, and
      (4) means for releasably securing said frame sections to one another, and
   (d) a clamping device for detachably securing the inner end portions of the supporting member to the top wall of the mower housing with said frame abutting and generally encompassing the discharge opening of said mower housing.

4. A grass catching attachment for lawn mower housings of the type having a lateral discharge opening, said attachment comprising:
   (a) an elongated supporting member having a bag-supporting outer end portion and a pair of horizontally spaced inner end portions adapted for securement to the top wall of the mower housing in closely spaced relation to said discharge opening,
   (b) a lip member secured between the spaced inner end portions of said supporting member and depending therefrom to engage the mower housing adjacent the discharge opening thereof when said attachment is secured to the mower housing,
   (c) a generally rectangular frame rigidly secured to said supporting member and depending therefrom in outwardly spaced relation to the inner end portions of said supporting member, said frame comprising:
      (1) two pairs of generally L-shaped frame sections each having a vertical portion and a horizontal portion and an intermediate corner portion,
      (2) said frame sections being disposed with the vertical and horizontal portions of one diagonally disposed pair of sections slidably received in the corresponding vertical and horizontal portions of the adjacent pair of frame sections and said intermediate corner portions forming the corners of the frame,
      (3) said frame sections being generally U-shaped in cross section and together defining an annular channel,
      (4) the engaged vertical and horizontal portions of said frame sections being extensible and retractable with respect to one another for increasing or decreasing the size of said rectangular frame to correspond with various sizes of mower discharge openings, and
      (5) means for releasably securing said frame sections to one another,
   (d) a clamping device for detachably securing the inner end portions of the supporting member to the top wall of the mower housing with said frame abutting and generally encompassing the discharge opening of said mower housing,
   (e) a bag adapted to be supported by the outer end portion of said elongated supporting member, and
   (f) means associated with the mouth portion of said bag for detachably securing the mouth of the bag about said annular channel of said frame.

References Cited by the Examiner
UNITED STATES PATENTS

| | | | |
|---|---|---|---|
| 2,932,146 | 4/60 | Campbell | 56—202 |
| 3,133,396 | 5/64 | Leader | 56—202 |

ABRAHAM G. STONE, *Primary Examiner.*

ANTONIO F. GUIDA, T. GRAHAM CRAVER,
*Examiners.*